April 8, 1924.
A. B. LANTZ
1,489,256
FLEXIBLE TINE HAYFORK
Filed Nov. 4, 1922
2 Sheets-Sheet 1
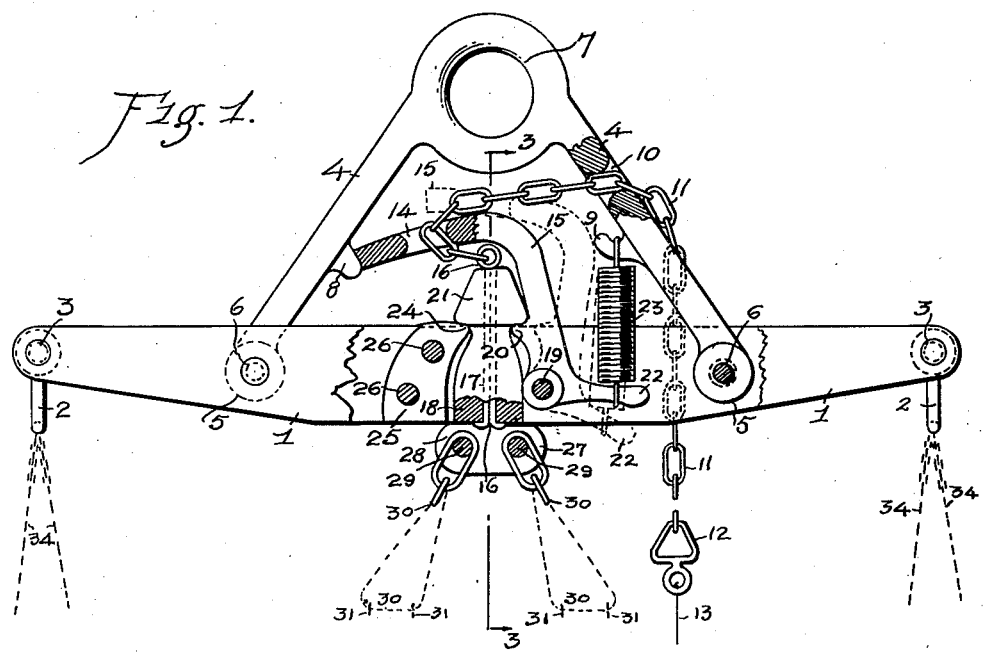
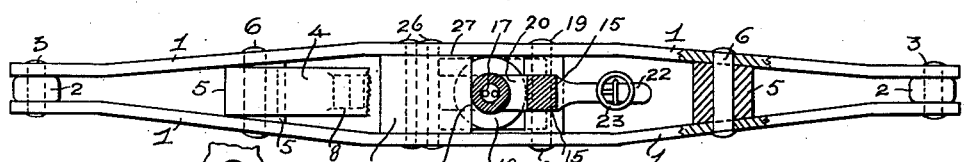
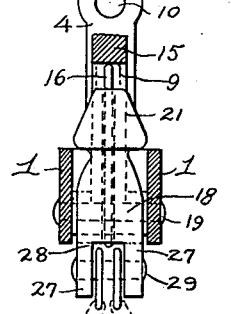

April 8, 1924.

A. B. LANTZ 1,489,256

FLEXIBLE TINE HAYFORK

Filed Nov. 4, 1922

Patented Apr. 8, 1924.

1,489,256

UNITED STATES PATENT OFFICE.

AMOS B. LANTZ, OF VALPARAISO, INDIANA.

FLEXIBLE-TINE HAYFORK.

Application filed November 4, 1922. Serial No. 599,082.

*To all whom it may concern:*

Be it known that I, AMOS B. LANTZ, a citizen of the United States, residing at Valparaiso, in the county of Porter and State of Indiana, have invented certain new and useful Improvements in Flexible-Tine Hayforks, of which the following is a specification.

My invention relates to improvements in flexible-tine hay forks and it more especially consists of the features hereinafter pointed out in the annexed claims.

The purpose of my invention is to provide a hay fork that is universally flexible; that is adapted to all grades and kinds of hay; that is more easily entered into the hay than any rigid type of fork; that in dumping the hay loosens the pile so as to make the work in the mow more easy; and that resets its release through the pulling back of the fork.

With these and other ends in view, I illustrate in the accompanying drawings such instances of adaptation as will disclose the broad underlying ground without limiting myself to the specific details shown thereon and described herein.

Figure 1 is a side elevation of the fork head partly in section detached from the tines.

Fig. 2 is a plan view of Fig. 1.

Fig. 3 is an elevation in section on line 3—3 of Fig. 1.

Figure 4:
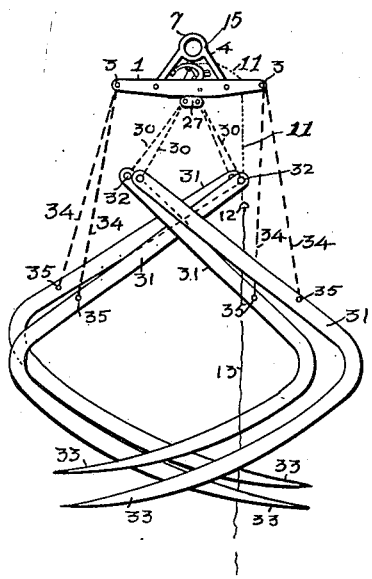
Fig. 4 is a semi-perspective elevation of a complete fork as it is returned and ready to be placed into the hay.
Figure 5:
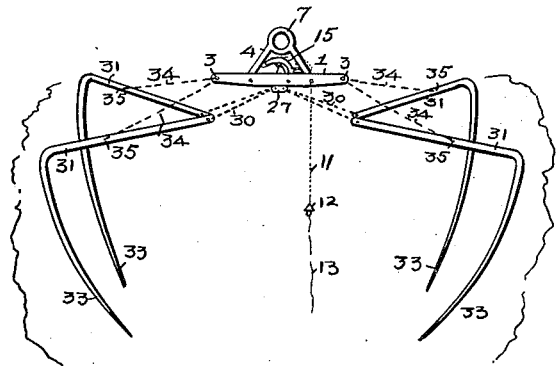
Fig. 5 is a similar view to Fig. 4 showing the fork with the tines spread and inserted in the hay.

In practically carrying out my invention, I may use the expedients instanced herein which in substance utilize the flexible features embodied in my co-pending application, Serial Number 377,405 filed April 28th, 1920. In this instance I have simplified the head of the fork and also made improvements in the suspension of the tines.

The fork head from which the tines are suspended is composed of two flat plates 1. At their ends suspension members 2 are supported by rivets or bolts 3 between the plates 1. A malleable casting 4 having two supporting arms which terminate in ears 5 is assembled with the ears 5 between the plates 1 where they are held by rivets or bolts 6. The two arms converge toward each other and at their junction an eye 7 is formed from which the entire fork is supported. One of the arms 4 has a stop 8 formed thereon and the other arm has a spring hook 9 and this latter arm in addition has an opening 10 through which the control chain 11 passes. The chain 11 has an enlarged eye 12 to which a pull rope 13 is attached. After the chain 11 passes through the opening 10, it passes through the opening 14 of the trip lever 15 and has its end secured to the eye 16 of the two part pin 17 which is secured to the swivel suspension 18.

Figure 7:
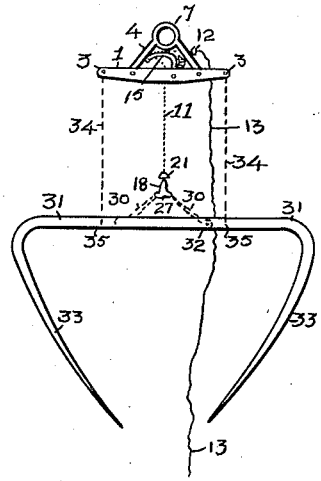
Fig. 7 is a side elevation of the fork immediately after dumping before it has been re-set.
Figure 6:
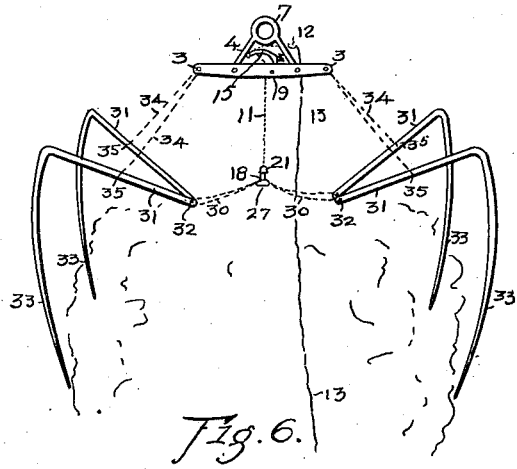
Fig. 6 is also similar to Fig. 1 showing the fork as the hay is being dumped.

The trip lever 15 is pivoted between the plates 1 on a bolt or rivet 19. This lever has a catch 20 for supporting the head 21 of the swivel 18 and it has a short lateral extension 22 to which one end of the spring 23 is attached and the other end of the spring is fastened to the hook 9. This spring keeps the trip lever 15 in engagement with the stop 8 until such time as it is pulled into position, shown by the dotted lines of Fig. 1, when the load is dropped. The head 21 of the swivel rests on the catch 20 of the trip lever 15 and on the projection 24 of a supporting block 25 placed between the plates 1 as shown in Figs. 1 and 2. The block 25 is held between the plates 1 by suitable rivets or pins 26. At the bottom end of the swivel 18 two depending ears 27 are formed leaving a channel 28 between them and pins 29 pass across this channel. Each of the chains 30 has both of its ends attached to one of the pins 29 so that each chain forms a separate loop on which a pair of tines 31 are adapted to slide loosely by reason of openings 32 formed at their upper ends. The four tines grouped in two sets have curved hook ends 33 and about midway of their length at 35 a separate chain 34 connects the same to the suspension eyes 2 placed at each end of the side bars 1. The trip chain 11 is made of a predetermined length so as to hold the swivel 18 from dropping too far when the load is tripped by reason of the enlarged eye 12 being unable to pass through the opening 10 of one of the supporting arms 4, as shown in Figs. 6 and 7.

The operation of the fork is extremely simple and yet positive in action. After a forkful of hay has been dumped in the mow the fork is brought back to the load on any well known track or rope, not shown, by means of the trip rope 13. The first result of pulling the trip rope is to raise the swivel 18 into the position, shown in Figs. 1 and 4, so that the tines 31 will hang suspended about as shown in Fig. 4. In this position the swivel 18 is securely held by the head 21 resting on the catch 20 and the support 24. Paradoxically the pulling of the chain 11, is the very factor that also causes the swivel to become reseated in the head. As soon as the swivel 18 is reseated a further pull on the trip rope 13 will bring the fork back to the starting point for another load. The construction as shown in Fig. 1 has been practically demonstrated without incurring any failures of operation.

What I claim is:

1. In flexible tine hay forks, a suitable head, means for supporting the same, a detachable swivel supported by the head, a pair of supporting loops secured to the swivel, a pair of independent and separate tines whose upper ends are free to slide on the supporting loops, and a separate chain for each tine secured to the ends of the head in pairs.

2. In flexible tine hay forks, a suitable head formed of a pair of bars spaced apart, a plurality of chains depending from each end of said bars, a suspending member secured to said head, a spring actuated tripping lever having a catch thereon pivoted between said bars, a supporting block secured between the bars while spaced apart from the catch, a detachable swivel having a supporting head formed thereon adapted to rest on the catch and the supporting block, a pair of loop chains secured to the swivel, a plurality of independent and separate curved tines slidable on the latter chains and separately supported by the previously mentioned chain, and means for releasing the swivel through a movement of the tripping lever.

3. In hay forks, a suitable head, a detachable and attachable swivel member operatively supported by said head, a plurality of independent and separate curved tines, means for supporting the said tines from the swivel and independently thereof from the head, and means for drawing the swivel into engagement with and releasing the same from the head as desired.

4. In hay forks, a suitable head, a suspending member therefor, a plurality of fixed supporting chains attached to the ends of the head, a swivel, a plurality of supporting chains attached to one end of the swivel, a controlling chain attached to the other end of the swivel, a supporting and releasing trip lever pivoted in the head, a spring for operating the lever in one direction, and means comprising the aforesaid controlled chain for operating the trip lever in the other direction to release the swivel.

5. In hay forks, a suitable head, a plurality of independent and separate curved tines, means for flexibly supporting the tines from the ends of the head at a limited distance therefrom, means for supporting the upper ends of the tines in an attachable and detachable manner to the head, and means for selectively holding the upper ends of the tines in flexible relation to the head and also releasing the same therefrom as desired.

In testimony whereof I affix my signature.

AMOS B. LANTZ.